(12) United States Patent
Horjus

(10) Patent No.: US 6,948,905 B2
(45) Date of Patent: Sep. 27, 2005

(54) HORIZONTAL WIND GENERATOR

(76) Inventor: Thomas W. Horjus, 4358 W. Peck Lake Rd., Saranac, MI (US) 48881

( * ) Notice: Subject to any disclaimer, the term of this patent is extended or adjusted under 35 U.S.C. 154(b) by 0 days.

(21) Appl. No.: 10/658,004

(22) Filed: Sep. 8, 2003

(65) Prior Publication Data
US 2004/0047723 A1 Mar. 11, 2004

Related U.S. Application Data

(60) Provisional application No. 60/408,700, filed on Sep. 6, 2002.

(51) Int. Cl.[7] .................................................. F03D 7/06
(52) U.S. Cl. .......................... 415/4.2; 415/4.4; 415/907; 416/197 A
(58) Field of Search ........................... 415/4.2, 4.4, 907; 416/197 A; 290/44, 55

(56) References Cited

U.S. PATENT DOCUMENTS

| 108,593 | A | * | 10/1870 | Heyworth et al. ........... 416/140 |
| 665,891 | A | | 1/1901 | Fetty |
| 683,935 | A | * | 10/1901 | Hensel ......................... 415/125 |
| 752,764 | A | * | 2/1904 | Dunne ............................ 417/35 |
| 2,224,851 | A | | 12/1940 | Lea |
| 3,897,170 | A | | 7/1975 | Darvishian |
| 3,930,750 | A | * | 1/1976 | Schultz ..................... 416/197 A |
| 4,037,989 | A | * | 7/1977 | Huther ..................... 416/197 A |
| 4,236,504 | A | | 12/1980 | Cornelison, Jr. |
| 4,321,005 | A | * | 3/1982 | Black ........................... 415/4.2 |
| 4,382,190 | A | | 5/1983 | Jacobson |
| 4,382,191 | A | * | 5/1983 | Potter ............................ 290/55 |
| 4,406,584 | A | | 9/1983 | Stepp |
| 4,419,587 | A | | 12/1983 | Benton |
| 4,508,972 | A | | 4/1985 | Willmouth |
| 5,299,913 | A | * | 4/1994 | Heidelberg ............. 416/197 A |
| 5,997,252 | A | | 12/1999 | Miller |

FOREIGN PATENT DOCUMENTS

DE          3832997 A1 *  4/1990  ............. F03D/9/00

* cited by examiner

Primary Examiner—Edward K. Look
Assistant Examiner—Igor Kershteyn
(74) Attorney, Agent, or Firm—John A. Waters; Varnum Riddering Schmidt Howlett LLP

(57) ABSTRACT

A horizontal wind generator comprises a horizontal windmill drivingly coupled to an electrical generator. The windmill includes a vertical drive shaft mounted for rotation in a base, with a plurality of wind drive units being mounted in wind catching positions at spaced axial locations along the drive shaft. The drive units comprise oppositely facing wind catching elements mounted on opposite sides of crossbars or frames non-rotatably attached to the pole. Multiple wind drive units are spaced along the pole and angularly displaced from adjacent units at regular intervals around the pole. Two or four spaced drive units are particularly desirable. Wind catcher elements formed of cup shaped bowls or split barrels are particularly effective and are inexpensive. The wind generator is drivingly attached to an electrical generator through a gear box and belt or chain drive mechanism. The horizontal windmill rotates the electrical generator within its desired speed range without any governor or speed control.

13 Claims, 5 Drawing Sheets

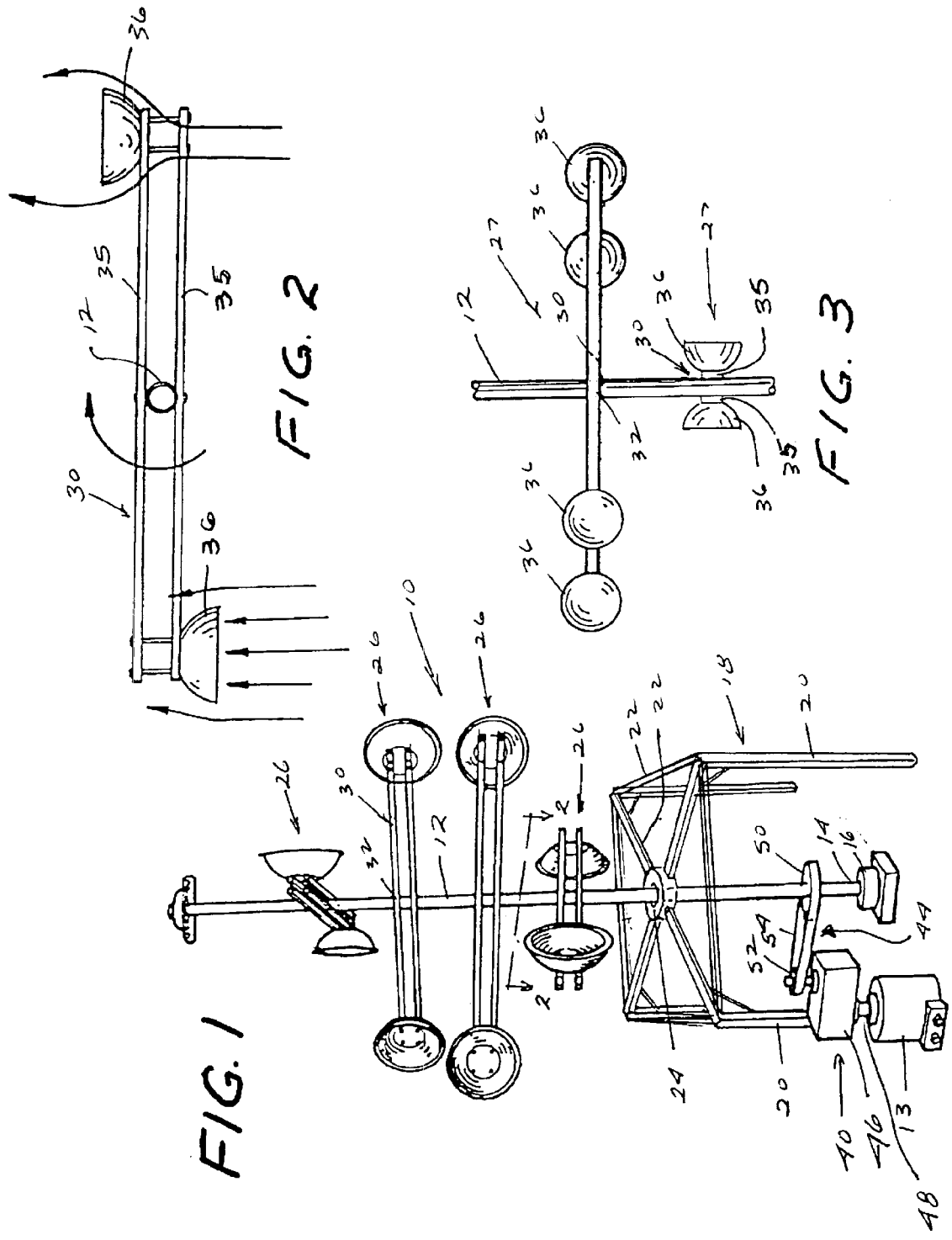

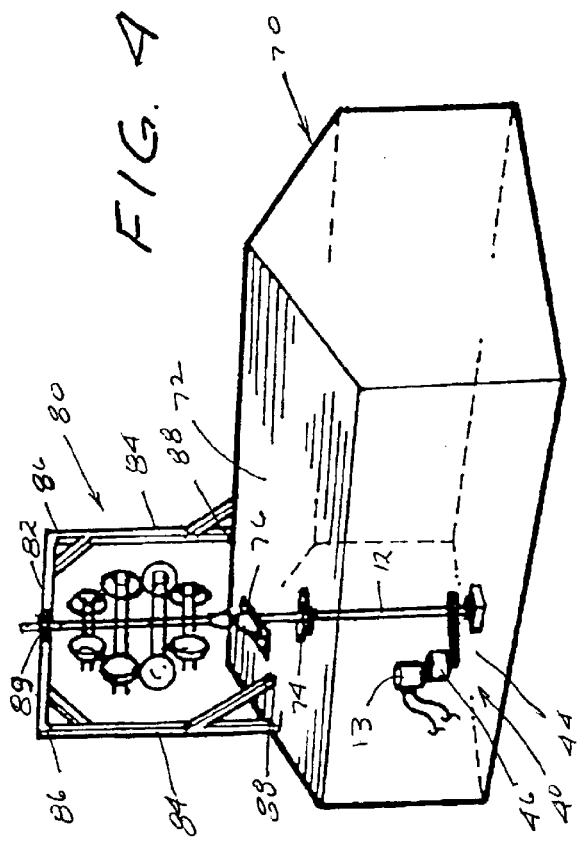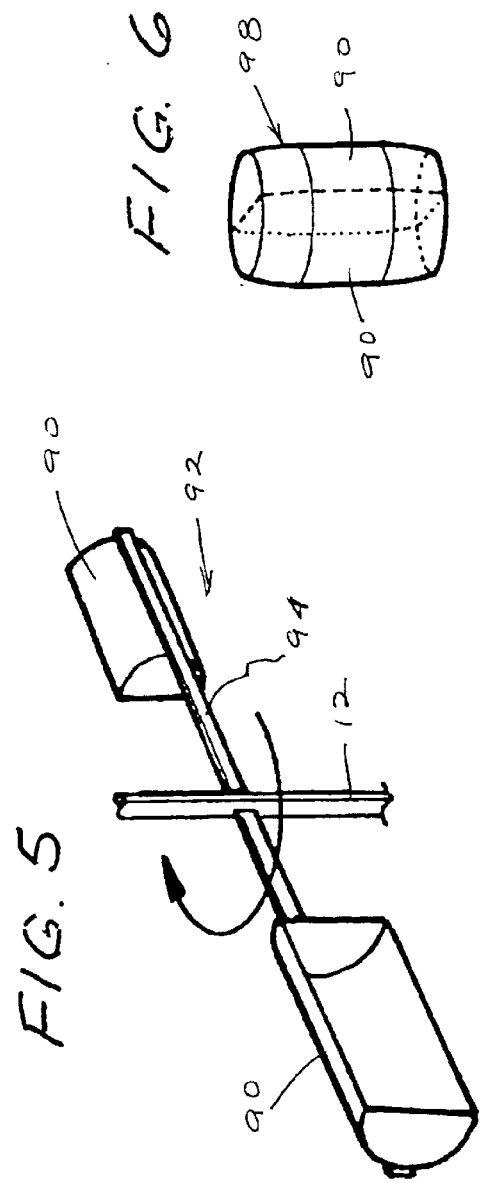

HORIZONTAL WIND GENERATOR

CROSS-REFERENCES TO RELATED APPLICATIONS

This is a non-provisional application based on and claiming the filing priority of abandoned provisional patent application Ser. No. 60/408,700, filed Sep. 6, 2002.

BACKGROUND OF THE INVENTION

Wind power is used for a number of purposes, including the operation of pumps and other mechanical devices and the generation of electricity. One of the more common types of wind power generators is a conventional windmill, wherein a blade or series of blades or the like rotate in a vertical plane about a horizontal axis. A problem with this type of drive mechanism is that the speed of a windmill blade increases with the speed of the wind applied to the blade. Most electrical generators operate most efficiently at a given rotational speed. Thus, such systems require a governor or other means to control the operating speed of the generator driven by the windmill. Some windmills include windmill blades where the pitch can be altered to vary the driving force of the wind.

Wind power also can be generated by a horizontal windmill, where wind catching devices rotate in a horizontal plane about a vertical axis. In a horizontal windmill, the wind catching devices are moving in a direction counter to the direction of the wind for one half of their rotational cycle, so the driving force of such a windmill is determined by the difference between the force generated on the wind catchers moving in the direction of wind flow and the wind catchers moving against the direction of wind flow. A number of challenges relating to cost and effectiveness of horizontal wind catchers have led to a number of different windmill constructions.

An object of the present invention is to provide a wind generator for efficiently developing electrical power from a wide range of available wind sources.

SUMMARY OF THE INVENTION

In accordance with the present invention, a horizontal windmill and electrical generator assembly comprises a vertical drive shaft mounted for rotation in a base, with the drive shaft extending upwardly into a wind catching position and with a plurality of drive units being mounted at spaced axial locations along the drive shaft. The drive units comprise oppositely facing wind catching elements or wind catchers mounted on the ends or at spaced locations along crossbars non-rotatably attached to the pole. Multiple drive units are used, with each drive unit being spaced axially from the other drive units and angularly disposed from adjacent units at regular intervals around the pole. Two or four spaced drive units are particularly desirable. Wind catchers formed of cup shaped bowls or split barrels are particularly effective and are cost effective.

The windmill is drivingly attached to an electrical generator through a gear box, with the components being interconnected by a conventional drive mechanism such as a belt or chain drive mechanism. With an appropriate selection of gear ratios, the windmill rotates the electrical generator within its desired speed range, under a wide variety of wind conditions without any governor or speed control, with the horizontal windmill being self modulating as to rotational speed.

These and other features of the present invention will hereinafter appear in connection with the detailed description of preferred embodiments set forth below and shown in the appended drawings.

BRIEF DESCRIPTION OF THE SEVERAL VIEWS OF THE DRAWING

FIG. 1 is a perspective schematic view of a horizontal wind generator constructed in accordance with the present invention.

FIG. 2 is a sectional view taken along lines 2—2 of FIG. 1.

FIG. 3 is a front elevational view of an alternative wind generator employing two drive units, with each drive unit including four wind catching cups on a single crossbar.

FIG. 4 is a perspective view showing the wind generator of the present invention mounted on the roof of a building.

FIG. 5 is an alternative view showing a wind catching device employing wind catchers formed in the shape of half barrels.

FIG. 6 is a perspective view showing the manner in which a plastic barrel can be divided in order to produce a pair of wind catching elements.

DETAILED DESCRIPTION OF THE INVENTION

Figure 7:
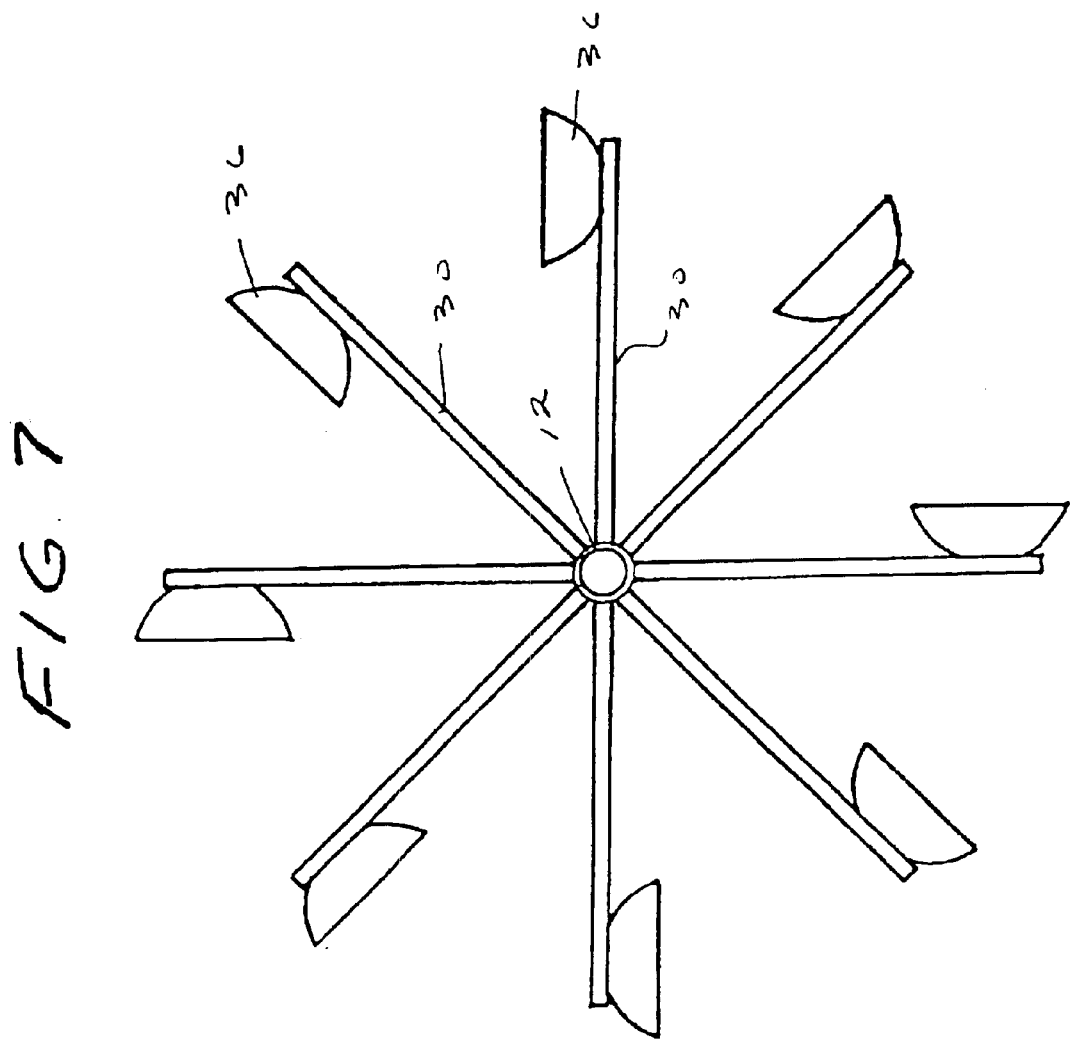
FIG. 7 is a schematic plan view of the wind generator of FIG. 1
Figure 8:
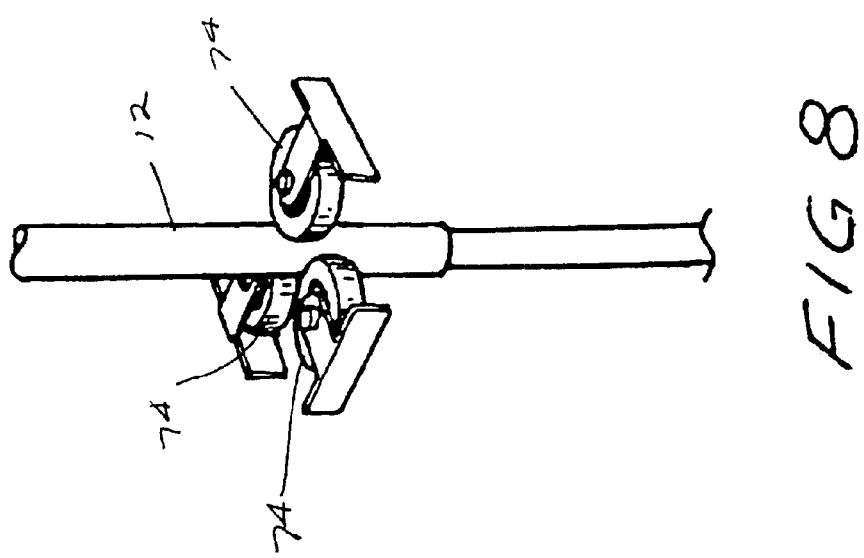
FIG. 8 is a perspective view showing an elevated pole support employed in the present invention.
Figure 9:
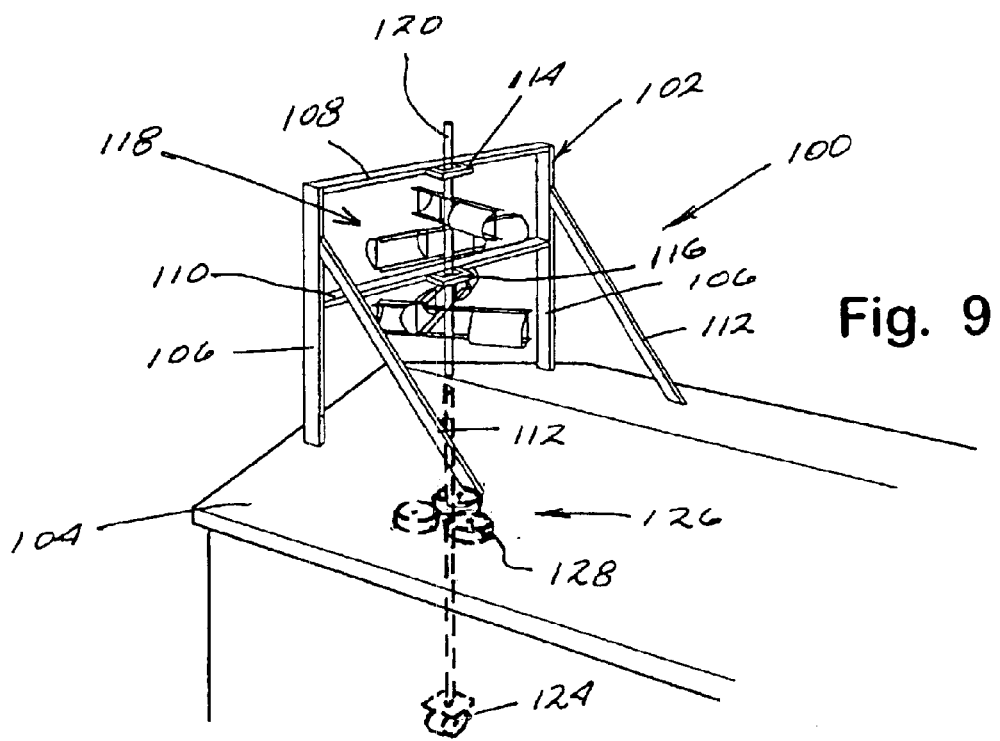
FIG. 9 is a perspective view of an alternative embodiment of the present invention.
Figure 10:
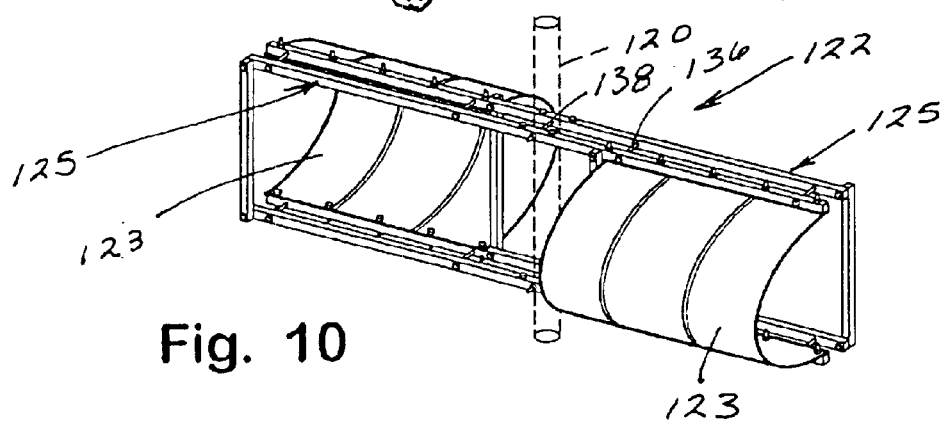
FIG. 10 is a perspective view of a drive unit of the embodiment of FIG. 9.
Figure 11:
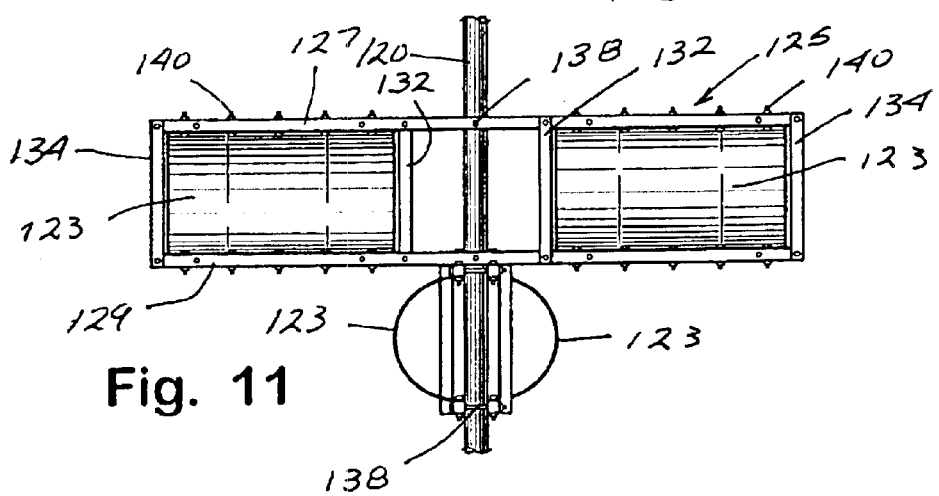
FIG. 11 is an elevational view of one set of pole mounted drive units of the embodiment of FIG. 9.
Figure 12:
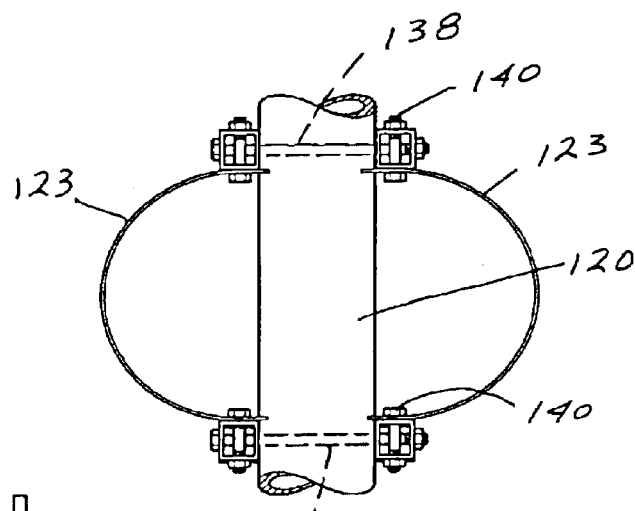
FIG. 12 is an end elevational view of a pole mounted drive unit of the embodiment of FIG. 9.

Referring to the drawings, a horizontal wind generator 10, shown schematically in FIG. 1, comprises a horizontal wind mill 11 connected with an electrical generator 13. Horizontal windmill 11 comprises a rotatable vertical pole 12 having a base 14 supported by bearings 16. A frame 18 comprising legs 20 and crossbars 22 supports the pole at an elevated position by means of suitable bearings 24 or the like that engage the pole and permit rotation thereof in the frame. The frame can take any form that provides stable support for the pole.

An upper portion of pole 12 is elevated to a position where it is accessible to wind forces. A plurality of horizontal wind drive units 26 are mounted at axially spaced locations along an upper portion of pole 12. The wind drive units can be identical (but do not have to be) but are angularly displaced at regular intervals about the axis of the pole (see FIG. 7). When four drive units are employed, as shown in FIG. 1, the drive units are axially displaced by forty-five degrees, so that the four drive units are spaced at equal intervals about the pole (see FIG. 7). The drive units of FIG. 1 are spaced in spiral fashion, with the angle of each drive unit being forty-five degrees displaced in a rotational direction from the immediately adjacent drive unit. Desirably, there are either or two or four drive units per generator, with the drive units being spaced apart at a distance sufficient to minimize turbulence between adjacent drive units.

An alternative configuration, shown in FIG. 3, employs two drive units 27 mounted on a single pole, with each drive unit having four wind catchers 36. The drive units could have two wind catchers per cross bar, as in the FIG. 1 embodiment. In this case, the drive units are separated by an angle of ninety degrees.

Referring again to FIG. 1, each drive unit 26 comprises a crossbar 30 fastened nonrotatably at its midpoint 32 to pole 12. At outer ends of the crossbar, wind catcher elements or wind catchers 36 are mounted. Wind catcher elements 36 each face in an opposite direction. Each wind catcher element is shaped so that it presents more resistance to wind flow over the wind catcher element in one direction than in the opposite direction. A wind catcher element in the form of a cup or bowl is shown in FIGS. 1–4. An eighteen inch stainless steel mixing bowl works well as a wind catcher. The concave side of the bowl presents a greater resistance to wind flow than the convex side of the bowl. Thus, when wind flows in a single direction, the bowl with the concave surface facing upwind exerts greater resistance to wind flow than the opposite bowl, wherein the concave surface faces downwind. This causes the upwind facing bowl to move in a downwind direction and causes the downwind facing bowl to rotate in an upwind direction. The rotational force exerted by any one drive unit is greatest when the wind drive unit crossbar is oriented directly perpendicular to the wind, and the force exerted by the wind drive unit is least when the wind drive unit crossbar is parallel to the wind. By spacing the wind drive units at regular angular intervals about the pole, at least some of the wind drive units will be in a driving position at all times.

In the illustrated embodiment, crossbar 30 is formed of two pairs of spaced parallel rods or bars 35, with one pair being positioned on each side of the pole. The wind catcher elements are metal bowls mounted by bolts at the ends of the rods. This provides a secure construction of the drive unit and holds the wind catcher elements securely in a horizontally facing direction. A concave bowl provides a good and efficient wind catcher element. Some other shapes do not work as well.

At the bottom of the pole (which can be a tubular flagpole), a generator drive mechanism 40 interconnects the windmill with the electrical generator 13. Generator drive unit 40 includes a belt or chain drive mechanism 44 that drives a gear box 46, with the gear box driving the electrical generator by means of a belt or chain or other drive mechanism 48. Other types of drive mechanisms could be employed. Drive mechanism 44, shown in the drawings, is a belt drive mechanism employing a pulley 50 mounted on the pole and a corresponding pulley 52 mounted on a drive shaft for the gear box. A belt 54 interconnects pulleys 50 and 52. Drive 48 transmits a driving force from an output shaft 58 on the gear box to an input drive shaft on the electrical generator.

An alternative wind drive unit construction is shown in FIG. 3. In this construction, two spaced wind catcher bowls 36 are positioned on each side of the pole, with the bowls being spaced longitudinally along the crossbar 30. Additional wind catchers on each crossbar provide increased driving force for the unit.

FIG. 4 illustrates the incorporation of a horizontal wind generator 10 in accordance with the present invention in the roof of a building 70. Pole 12 extends through a roof 72 of the building. Wheels 74 mounted on bearings in an upper portion of the building (not shown) are aligned with an opening 76 in the roof of the building and spaced angularly around the pole. The wheels, which can be automobile wheels, engage the outer sides of the pole and hold it in place, while permitting the pole to rotate. A base 77 including bearings supports the bottom of the pole against thrust as well as lateral forces. Electrical generator 13 of the same general type as described above is coupled to the rotating pole by generator drive mechanism 40 in order to provide energy to drive the electrical generator.

Another feature of the wind generator of FIG. 4 is the incorporation of a support frame 80. Frame 80 is mounted on the roof of the building. Frame 80 includes a crossbar 82 with legs 84 mounted at each end of the crossbar. Legs 84 are connected at an upper end 86 to the crossbar and at lower ends 88 to the roof. The frame crossbar 82 is attached to the upper end of the pole by means of a bearing assembly 89. The frame thus holds the pole in an upright position on the roof. The wind generator rotates in the presence of the wind in order to generate electricity in the generator in the building.

Another type of wind catcher element 90 is shown in an alternative embodiment of the drive unit 92 in FIGS. 5 and 6. A crossbar 94 (shown schematically), which can be a solid bar or can be substantially the same as crossbar 30, is attached to pole 12. Wind catchers 90, instead of being bowl or cup shaped elements, are in the form of half barrels and in fact can be half barrels formed by splitting a barrel 98 in half, as shown in FIG. 6. The half barrels are attached longitudinally along crossbar 94, as shown in FIG. 5. Barrels provide a larger wind catching surface and thus provide more power for the generator than is provided by cups. The half barrels can be attached to the crossbar by bolts or the like.

Another embodiment 100 of the present invention is shown in FIGS. 9–14. In this embodiment, a frame 102 formed of wood or the like is mounted on a building 104. The frame has a pair of spaced uprights or legs 106, an upper cross member or crossbar 108, and a lower cross member or crossbar 110 extending between the uprights. Angle braces 112 support the uprights in a vertical position. Upper and lower rectangular bearing support frames 114 and 116 are mounted on the upper and lower crossbars.

A horizontal windmill 118 is mounted in the frame. The horizontal windmill comprises a vertical pole 120 on which four separate drive units 122 are mounted in upper and lower sections, each section comprising two drive units separated by a 90-degree angle, with the upper and lower drive unit sections being angularly separated by a 45-degree angle, so that the windmill comprises 4 sets of drive units separated by a 45-degree angle. Preferably, the pole comprises a tapered aluminum pole. In the illustrated embodiment, the pole is approximately 27 ½ feet tall and has a 3-inch diameter at the base tapering to about 2 inches at the top.

The base of the pole is mounted on a double ball bearing rotating caster 124, which serves as a thrust bearing and permits rotation of the pole. Spaced about 12 feet above the base is a pole support 126 comprising three 6-inch wheels 128 equally spaced around the pole. The upper portion of the pole is supported vertically by four 2-inch wheels 130 equally spaced around the pole and mounted in lower bearing support frame 116. Wheels can also be mounted in upper bearing support frame 114. The various wheels hold the pole erect and resist deflecting forces, while permitting the pole to rotate freely.

One important difference between this embodiment and the previous embodiments is the construction of the individual drive units 122. Each drive unit comprises two wind catchers 123 each formed in the shape of a split cylindrical tube or split barrel with open ends. The tube or barrel is preferably a conventional and relatively inexpensive 55-gallon plastic drum. Such drums are readily available. A conventional 55 gallon plastic drum is about 31 inches in length and has a diameter of about 22 inches. These are split longitudinally in half and the ends are removed, so that the drum sections have a C-shaped cross section. Each drum section constitutes a wind catcher element.

Wind catcher elements 123 are mounted to the pole 120 by means of a rectangular frame 125, preferably formed of one inch square aluminum tubing. Each frame has upper and lower horizontal members 127 and 129, respectively, and inner and outer side members 132 and 134, respectively, connected together in a rigid rectangular frame by bolting or otherwise. Upper and lower edges of the wind catcher elements 123 are attached, by bolting, to upper and lower horizontal members 127 and 129.

Figure 13:
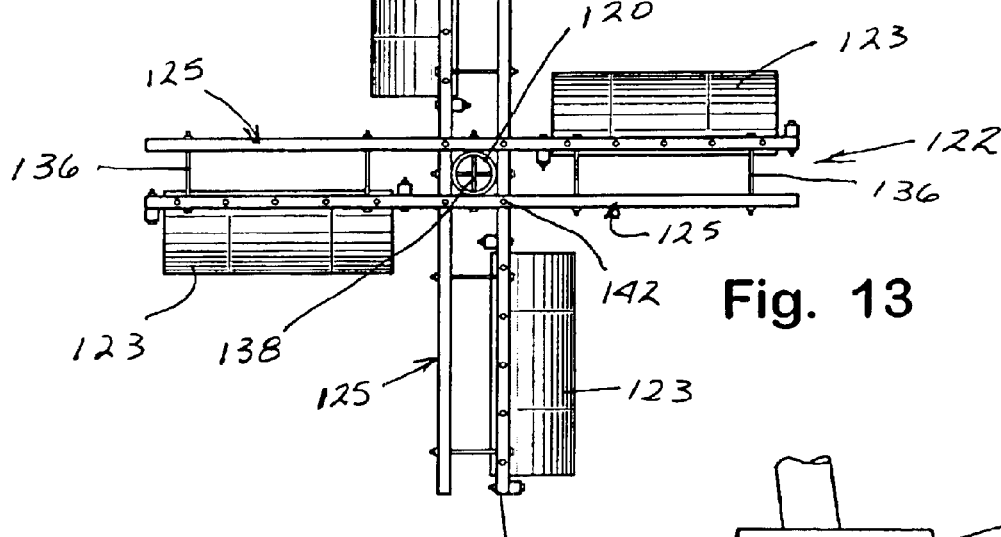
FIG. 13 is a plan view of a set of pole mounted drive units of the embodiment of FIG. 9.
Figure 14:
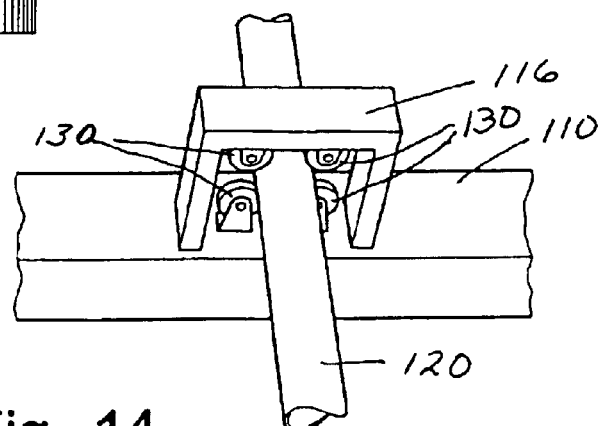
FIG. 14 is a perspective view of a pole support of the embodiment of FIG. 9.

As shown in FIG. 13, there is one rectangular frame 125 on each side of the pole 120 for each drive unit, with one wind catcher element being mounted on each rectangular frame. The rectangular frames for each drive unit are connected together by spacer bolts 136, which hold the frames at a uniform spacing along the length. Separate bolts 138 extend through the frames and the vertical pole to support the frames nonrotatably on the pole. Thus, rotational force exerted on the frames by the wind catcher elements rotates the pole.

The wind catcher elements are mounted on the upper and lower horizontal members by suitable fasteners 140, such as two-inch machine screws spaced along the length of the pole. Each wind catcher for each frame faces in an opposite direction, so that wind force rotates the wind catcher elements in the direction of the concave side of the wind catcher elements.

Each set of two pairs of half barrels are offset by 90 degrees and abut each other. The frames are connected together at the abutment intersections by three-inch bolts 142 in order to maintain the 90 degree orientation. The two sets of two pairs of drive members are offset by 45 degrees. The lower cross member is located between the two sets of drive members. The drive members thus are oriented at 45-degree spacing around the periphery of the pole.

For maximum effect, the wind catchers should span the entire length of the available frame between the pole and the outer side member. Because a conventional 55-gallon drum is only about 31 inches long, an additional 9 inches from another section of drum can be added to each wind catcher element in order to maximize the space available for a wind catcher element.

In operation, the rigid frame for the wind catcher elements holds the wind catchers firmly in place as they rotate the pole. The open ends of the wind catcher elements provides for better air flow and improved operation of the wind catcher elements. The rigid frame and concave wind catcher elements provide a rigid and inexpensive and yet very effective construction of the horizontal windmill of the present invention.

While other types of wind catcher elements are possible, the bowl and half barrel constructions illustrated in the present application, and particularly the open-ended half barrel construction, have been found to be quite effective and yet are inexpensive and readily available.

As discussed above, an important feature of the present invention is that the speed of the wind generator is relatively constant over a wide variation in wind speed. This is a particular advantage in an electrical generating system, because electrical generators have optimum rotational speeds. By using an appropriate gear mechanism, an optimum rotational speed can be applied to the electrical generator without requiring governors or other expensive control devices to control generator speed.

Another important feature of the present invention is not only the nature and shape of the cups or barrels (which can be conventional fifty-five gallon plastic drums) is the construction and spacing of the drive units. It has been found that two or four wind drive units per pole is quite effective, with one or two bowls being attached to each side of the crossbar, or with one plastic barrel half being attached to each side of the crossbar. Further, it is preferred that the crossbars be singular units. This is a stronger construction than crossbars that are simply spokes cantilevered at inner ends to the pole. It is also important that the crossbars be angularly disposed at regular intervals about the pole. The particular construction of the crossbars and wind catchers of the present invention has been found to be quite satisfactory.

It should be understood that various modifications can be made in the arrangements and details of construction without departing from the spirit and scope of the present invention.

I claim:

1. A horizontal wind generator comprising:
   a horizontal windmill comprising:
   a generally vertical drive shaft mounted for rotation about a vertical axis; and
   at least two wind drive units mounted at predetermined angular positions around the drive shaft, each wind drive unit including one or more transverse cross members non-rotatably attached to the drive shaft and extending in opposite directions therefrom, at least one wind catcher element being mounted on the cross member on each side of the pole and spaced radially outwardly therefrom, each wind catcher element having front and rear sides, with the front side presenting greater resistance to wind flow thereover than the rear side when the sides are facing in an upwind direction, the wind catcher elements on each side of the cross member facing in opposite directions, such that a wind urges the drive unit to rotate in a direction wherein the upwind facing front side is moving in a downwind direction, the wind catcher elements being formed in the shape of generally C-shaped members having open ends, the wind catcher elements having longitudinal axes and being mounted on the cross members with their longitudinal axes being in a substantially horizontal position, the C-shaped members having substantially straight horizontal inner and outer wind engaging sidewalls that permit wind to flow smoothly along the sidewalls between the open ends of the members; and
   an electrical generator drivingly connected to the drive shaft so as to produce electrical energy in response to the rotation of the drive shaft.

2. A horizontal wind generator as in claim 1 wherein the cross member comprises a rectangular frame having upper and lower horizontal members, with the C-shaped members having upper and lower sides attached respectively to the upper and lower horizontal members.

3. A horizontal wind generator as in claim 1 wherein the C-shaped members comprise tubular members that are split longitudinally substantially in half.

4. A horizontal wind generator as in claim 3 wherein the C-shaped members comprise longitudinally split 55 gallon plastic drums with the ends removed.

5. A horizontal wind generator as in claim 1 wherein the generator includes a first set of two drive units angularly displaced at a 90° angle from each other.

6. A horizontal wind generator as in claim 5 wherein the generator includes a second set of two drive units angularly displaced from each other by a 90° angle, with the second set being displaced from the first set by a 45° angle.

7. A horizontal wind generator as in claim 1 wherein the drive shaft is mounted on a thrust bearing at a lower end, the drive shaft being maintained in a vertical position by one or more vertical supports comprising a plurality of at least three rotatable wheels mounted for rotation about the axis of the drive shaft and angularly spaced around the periphery of the drive shaft.

8. A horizontal wind generator as in claim 1 wherein each wind drive unit is mounted at a separate axial wind catching position on the drive shaft.

9. A horizontal wind generator as in claim 1 wherein the cross member comprises a frame mounted on the drive shaft and extending outwardly from opposite sides thereof, the frame having upper and lower horizontal members, the front sides of the C-shaped members having upper and lower front edges attached respectively to the upper and lower horizontal members, the C-shaped members being positioned such that air flowing longitudinally along the front side of one C-shaped member from the open outer end through the open inner end at least partially flows through the open inner end of the opposite C-shaped member and thereafter flows across the front side of said C-shaped member and then out the open outer end.

10. A horizontal wind generator as in claim 9 wherein the cross member includes upper and lower horizontal members on each side of the drive shaft, each C-shaped members being attached to the horizontal members on the side of the drive shaft on which the rear side of the C-shaped member extends.

11. A horizontal wind generator comprising:
a horizontal windmill comprising:
a generally vertical drive shaft mounted for rotation about a vertical axis; and
at least one wind drive unit mounted in a wind catching position on the drive shaft, the wind drive unit including a transverse cross member non-rotatably attached to the drive shaft, and at least two wind catcher elements mounted on the cross member on opposite sides of the pole and spaced radially outwardly therefrom, each wind catcher element having front and rear sides, with the front side presenting greater resistance to wind flow thereover than the rear side when the sides are facing in an upwind direction, the wind catcher elements on each side of the cross member facing in opposite directions, such that a wind urges the drive unit to rotate in a direction wherein the upward facing front side is moving in a downwind direction, the wind catcher elements comprising open ended C-shaped members, the C-shaped members comprising longitudinally split 55 gallon plastic drums with the ends removed; and
an electrical generator drivingly connected to the drive shaft so as to produce electrical energy in response to the rotation of the drive shaft.

12. A horizontal wind generator comprising:
a horizontal windmill comprising:
a generally vertical drive shaft mounted for rotation about a vertical axis; and
at least one wind drive unit mounted in a wind catching position on the drive shaft, the wind drive unit including a transverse cross member non-rotatably attached to the drive shaft, and at least two wind catcher elements mounted on the cross member on opposite sides of the pole and spaced radially outwardly therefrom, each wind catcher element having front and rear sides, with the front side presenting greater resistance to wind flow thereover than the rear side when the sides are facing in an upwind direction, the wind catcher elements on each side of the cross member facing in opposite directions, such that a wind urges the drive unit to rotate in a direction wherein the upward facing front side is moving in a downwind direction, the drive shaft being mounted on a thrust bearing at a lower end of the drive shaft, the drive shaft being maintained in a vertical position by one or more vertical supports comprising a plurality of at least three rotatable wheels mounted for rotation about the axis of the drive shaft and angularly spaced around the periphery of the drive shaft; and
an electrical generator drivingly connected to the drive shaft so as to produce electrical energy in response to the rotation of the drive shaft.

13. A horizontal wind generator comprising:
a horizontal windmill comprising:
a generally vertical drive shaft mounted for rotation about a vertical axis; and
at least two wind drive units mounted to the drive shaft, each drive unit being mounted at a different axial position on the drive shaft, such that horizontal wind flow against one drive unit will not substantially interfere with horizontal wind flow against the other drive unit, each drive unit comprising oppositely facing wind catcher elements mounted on opposite sides of the drive shaft at an angular spacing of about 180 degrees, each wind catcher element having oppositely facing convex and concave sides, each wind catcher element being mounted on the drive shaft by a cross bar non-rotatably attached to the drive shaft, the drive unit having wind catcher elements only at the two angular positions spaced 180 degrees apart on opposite sides of the drive shaft and having no intervening wind catchers at other angular positions at the same axial position on the drive shaft, such that horizontal air flow against one wind catcher element at one axial position will not substantially block air flow against another wind catcher at the same axial position; and
an electrical generator drivingly connected to the drive shaft so as to produce electrical energy in response to the rotation of the drive shaft.

* * * * *